UNITED STATES PATENT OFFICE.

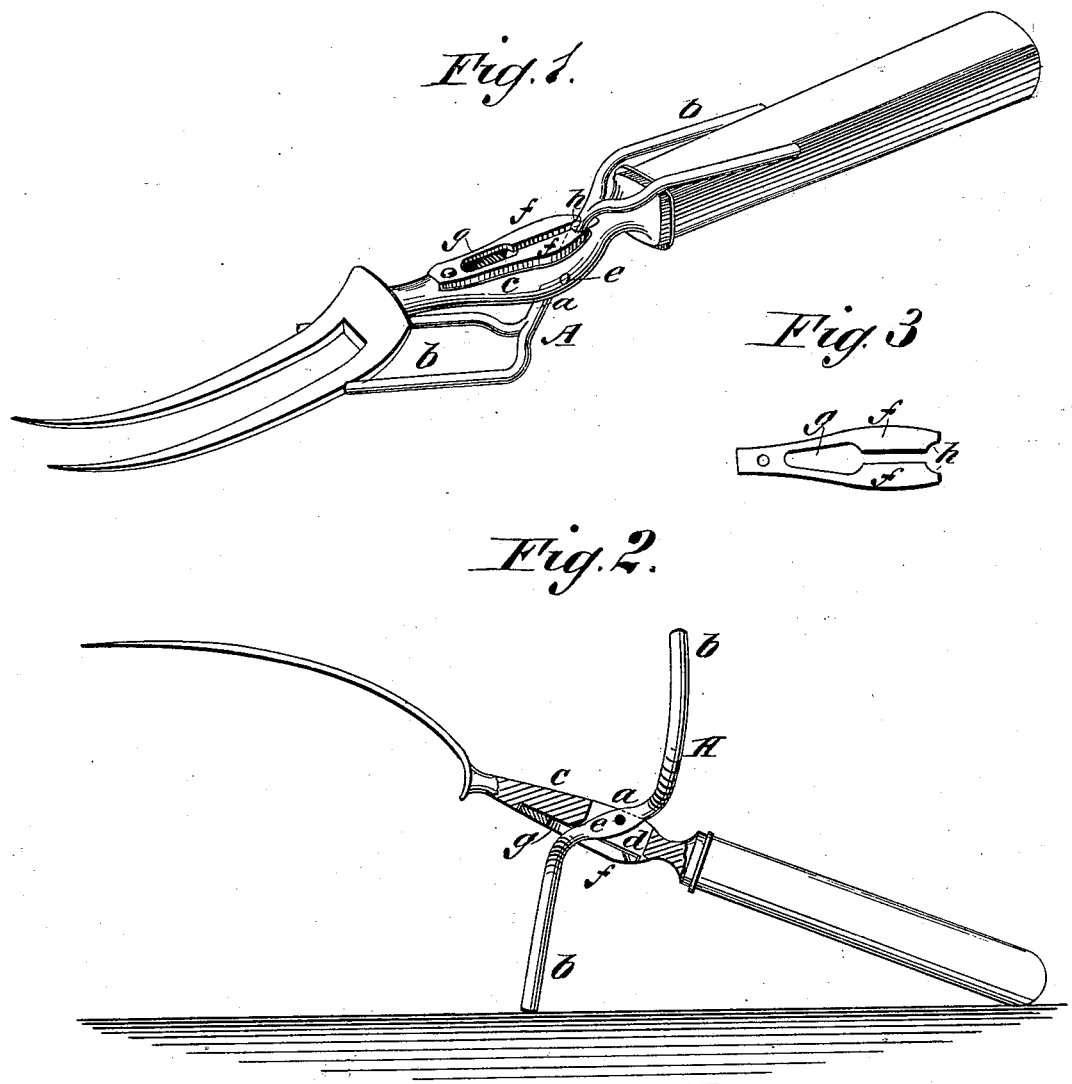

TERENCE F. CURLEY, OF BROOKLYN, NEW YORK.

FORK-GUARD.

SPECIFICATION forming part of Letters Patent No. 275,155, dated April 3, 1883.

Application filed October 23, 1882. (No model.)

*To all whom it may concern:*

Be it known that I, TERENCE F. CURLEY, of Brooklyn, in the county of Kings and State of New York, have invented a new and Improved Fork-Guard, of which the following is a full, clear, and exact description.

My invention relates to guards applied to carving-forks; and it consists in a peculiarly-constructed device for locking the guards in either position, either raised or lowered, so that they may not become misplaced, as hereinafter described and claimed.

Reference is to be had to the accompanying drawings, forming a part of this specification, in which similar letters of reference indicate corresponding parts in all the figures.

Figure 1 is a perspective view of a fork and guard with my improvement. Fig. 2 is a sectional side view of the same. Fig. 3 is a plan view of the locking-springs.

The guard A may be of any desired form or shape. As shown, it consists of a central portion or shank, $a$, provided at its ends with arms or forks $b$. The shank $c$ of the carving-fork is formed with a slot, $d$, through which the shank $a$ of the guard passes, and in which slot the guard is attached by a cross-pin, $e$. Upon one side of the shank of the fork are attached spring-arms $ff$, preferably constructed, as shown, of a single plate of steel slotted lengthwise to form the two springs $f$. The slot or space between the two springs $f$ is enlarged at one end, as shown at $g$, and at their outer ends the springs are notched or recessed at $h$. When the guard is closed down upon the fork, as shown in Fig. 1, the shank $a$ of the guard is caught by the notched ends $h$ of the springs, and the guard is thus held in that position. To raise the guard pressure is required to force the springs $ff$ apart, and the shank $a$ passes between the springs until it reaches the notched end $g$ of the slot. The guard is then in its raised position, and is retained in that position by the spring. It will thus be seen that the guard is locked in either position in which it may be placed.

Having thus described my invention, I claim as new and desire to secure by Letters Patent—

The combination, with the fork and guard A, of the locking device having the spring-arms $f$, with a narrow longitudinal slot between them, said slot extending from the free end of the said device and terminating in an enlarged slot or recess, $g$, the free ends of said springs having recesses $h$ to clasp the shank of the guard, whereby the guard is locked either in its closed or open position, as shown and described.

TERENCE F. CURLEY.

Witnesses:
   W. WILTSHIRE,
   M. W. BELFORD.